United States Patent
Chou et al.

(10) Patent No.: US 9,665,375 B2
(45) Date of Patent: May 30, 2017

(54) MITIGATION OF THREAD HOGS ON A THREADED PROCESSOR AND PREVENTION OF ALLOCATION OF RESOURCES TO ONE OR MORE INSTRUCTIONS FOLLOWING A LOAD MISS

(75) Inventors: Yuan C. Chou, Los Gatos, CA (US); Robert T. Golla, Round Rock, TX (US); Mark A. Luttrell, Cedar Park, TX (US)

(73) Assignee: Oracle International Corporation, Redwood Shores, CA (US)

( * ) Notice: Subject to any disclaimer, the term of this patent is extended or adjusted under 35 U.S.C. 154(b) by 491 days.

(21) Appl. No.: 13/457,055

(22) Filed: Apr. 26, 2012

(65) Prior Publication Data

US 2013/0290675 A1    Oct. 31, 2013

(51) Int. Cl.
*G06F 9/312* (2006.01)
*G06F 9/38* (2006.01)
*G06F 9/50* (2006.01)
*G06F 9/30* (2006.01)

(52) U.S. Cl.
CPC ........ *G06F 9/3861* (2013.01); *G06F 9/30043* (2013.01); *G06F 9/3851* (2013.01); *G06F 9/3867* (2013.01); *G06F 9/50* (2013.01)

(58) Field of Classification Search
CPC ......... G06F 9/3861; G06F 9/3867; G06F 9/50
USPC ........................................................ 712/214
See application file for complete search history.

(56) References Cited

U.S. PATENT DOCUMENTS

| | | |
|---|---|---|
| 6,154,849 A | 11/2000 | Xia |
| 6,334,177 B1 | 12/2001 | Baumgartner et al. |
| 6,535,905 B1 | 3/2003 | Kalafatis et al. |
| 6,694,425 B1 * | 2/2004 | Eickemeyer .......... G06F 9/3851 712/216 |
| 6,785,803 B1 | 8/2004 | Merchant et al. |
| 6,898,687 B2 | 5/2005 | Wu et al. |
| 7,000,047 B2 | 2/2006 | Nguyen et al. |

(Continued)

OTHER PUBLICATIONS

Haitham AKkary, A dynamic Multithreading Processor, 1998, Published in Proceeding MICRO 31 Proceedings of the 31st Annual ACM/IEEE International symposium on Microarchitecture, p. 226-236.*

(Continued)

*Primary Examiner* — David J Huisman
(74) *Attorney, Agent, or Firm* — Rory D. Rankin; Meyertons, Hood, Kivlin, Kowert & Goetzel, P.C.

(57) ABSTRACT

Systems and methods for efficient thread arbitration in a threaded processor with dynamic resource allocation. A processor includes a resource shared by multiple threads. The resource includes an array with multiple entries, each of which may be allocated for use by any thread. Control logic detects a load miss to memory, wherein the miss is associated with a latency greater than a given threshold. The load instruction or an immediately younger instruction is selected for replay for an associated thread. A pipeline flush and replay for the associated thread begins with the selected instruction. Instructions younger than the load instruction are held at a given pipeline stage until the load instruction completes. During replay, this hold prevents resources from being allocated to the associated thread while the load instruction is being serviced.

14 Claims, 5 Drawing Sheets

(56) References Cited

U.S. PATENT DOCUMENTS

| | | | |
|---|---|---|---|
| 7,330,988 B2 | 2/2008 | Golla et al. | |
| 7,509,484 B1* | 3/2009 | Golla | G06F 9/3802 |
| | | | 712/203 |
| 8,037,250 B1* | 10/2011 | Barreh et al. | 711/125 |
| 2002/0091914 A1* | 7/2002 | Merchant et al. | 712/219 |
| 2004/0226011 A1* | 11/2004 | Augsburg et al. | 718/100 |
| 2005/0044319 A1 | 2/2005 | Olukotun | |
| 2007/0118726 A1 | 5/2007 | Abernathy et al. | |
| 2007/0204137 A1* | 8/2007 | Tran | G06F 9/30181 |
| | | | 712/214 |
| 2007/0282928 A1 | 12/2007 | Jiao et al. | |
| 2008/0114972 A1* | 5/2008 | Codrescu et al. | 712/227 |
| 2008/0201563 A1* | 8/2008 | Dale et al. | 712/234 |
| 2008/0250233 A1 | 10/2008 | Marden et al. | |
| 2009/0271592 A1* | 10/2009 | Jensen | 712/214 |
| 2010/0115244 A1* | 5/2010 | Jensen et al. | 712/220 |
| 2010/0293420 A1* | 11/2010 | Kapil et al. | 714/710 |
| 2011/0029978 A1* | 2/2011 | Smolens et al. | 718/103 |
| 2011/0078697 A1* | 3/2011 | Smittle et al. | 718/104 |

OTHER PUBLICATIONS

Dean M. Tullsen, Exploiting Choice: Instruction fetch and issue on an Implementable Simultaneous Multithreading Processor, 1996, ACM Newyork, USA,vol. 24 issue 2, May 1996, pp. 191-202.*

* cited by examiner

MITIGATION OF THREAD HOGS ON A THREADED PROCESSOR AND PREVENTION OF ALLOCATION OF RESOURCES TO ONE OR MORE INSTRUCTIONS FOLLOWING A LOAD MISS

BACKGROUND OF THE INVENTION

Field of the Invention

This invention relates to computing systems, and more particularly, to efficient thread arbitration in a threaded processor with dynamic resource allocation.

Description of the Relevant Art

The performance of computer systems is dependent on both hardware and software. In order to increase the throughput of computing systems, the parallelization of tasks is utilized as much as possible. To this end, compilers may extract parallelized tasks from program code and many modern processor core designs have deep pipelines configured to perform multi-threading.

In software-level multi-threading, an application program uses a process, or a software thread, to stream instructions to a processor for execution. A multi-threaded software application generates multiple software processes within the same application. A multi-threaded operating system manages the dispatch of these and other processes to a processor core. In hardware-level multi-threading, a simultaneous multi-threaded processor core executes hardware instructions from different software processes at the same time. In contrast, single-threaded processors operate on a single thread at a time.

Often times, threads and/or processes share resources. Examples of resources that may be shared between threads include queues utilized in a fetch pipeline stage, a load and store memory pipeline stage, rename and issue pipeline stages, a completion pipeline stage, branch prediction schemes, and memory management control. These resources are generally shared between all active threads. Dynamic resource allocation between threads may result in the best overall throughput performance on commercial workloads. In general, resources may be dynamically allocated within a resource structure such as a queue for storing instructions of multiple threads within a particular pipeline stage.

Over time, shared resources can become biased to a particular thread, especially with respect to long latency operations such as loads that miss a last-level data cache. A thread hog results when a thread accumulates a disproportionate share of a shared resource and the thread is slow to deallocate the resource. For certain workloads, thread hogs can cause dramatic throughput losses for not only the thread hog, but also for other threads sharing the same resource.

In view of the above, methods and mechanisms for efficient thread arbitration in a threaded processor with dynamic resource allocation are desired.

SUMMARY OF THE INVENTION

Systems and methods for efficient and fair thread arbitration in a threaded processor with dynamic resource allocation are contemplated.

Embodiments are contemplated wherein a processor includes at least one resource that may be shared by multiple threads. Such a resource may, for example, be an array with multiple entries each of which may be allocated for use by a thread. Control logic within the pipeline may detect a load miss to memory, where the miss is associated with a latency greater than a given threshold. This load miss may cause an associated thread to become a thread hog, wherein the associated thread is slow to deallocate entries within one or more shared resources. In addition, the associated thread may allocate a disproportionate number of entries within one or more shared resources. In various embodiments, the control logic waits until the corresponding load instruction is an oldest instruction in the pipeline for the associated thread before taking steps to mitigate the thread hog.

In one embodiment, the control logic may select the load instruction as a first instruction to begin a pipeline flush for the associated thread. In such an embodiment, the control logic may determine the load instruction qualifies to be replayed. The load instruction may be replayed if its execution is permitted to be interrupted once started. In another embodiment, the control logic may select an oldest instruction of the one or more instructions younger than the load instruction to begin a pipeline flush for the associated thread. The instructions that are flushed from the pipeline for the associated thread may be re-fetched and replayed.

Also contemplated are embodiments wherein instructions younger in-program-order than the load instruction may be held at a given pipeline stage. The given pipeline stage may be a fetch pipeline stage, a decode pipeline stage, a select pipeline stage, or other. These younger instructions may be held at the given pipeline stage until the load instruction completes. In one embodiment, the load instruction may be held at the given pipeline stage until the control logic detects its associated data is ready. In another embodiment, the load instruction may be allowed to proceed past the given pipeline stage.

These and other embodiments will become apparent upon reference to the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Figure 1:
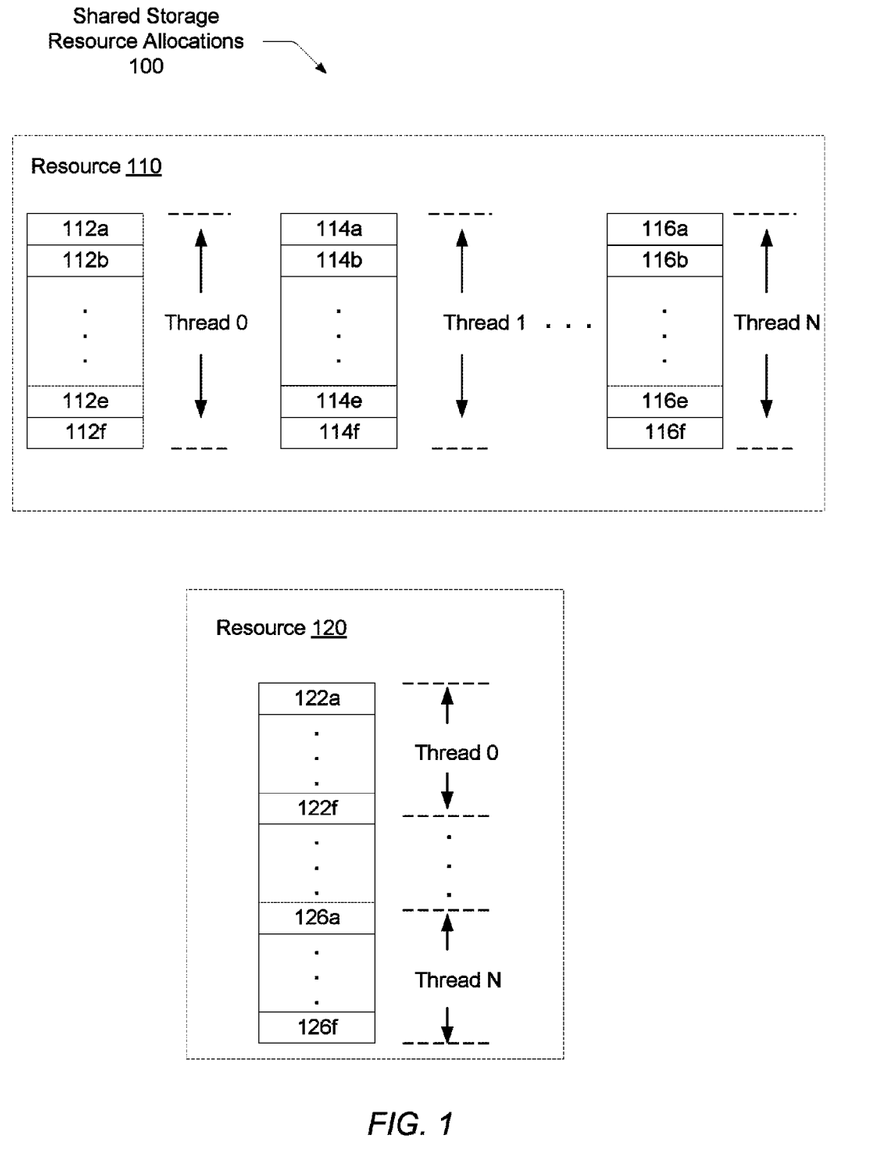
FIG. 1 is a generalized block diagram illustrating one embodiment of shared storage resource allocations.

Referring to FIG. 1, one embodiment of shared storage resource allocations 100 is shown. In one embodiment, resource 110 corresponds to a queue used for data storage on a processor core, such as a reorder buffer, a branch prediction data array, a pick queue, or other. Resource 110 may comprise a plurality of entries 112a-112f, 114a-114f, and 116a-116f. Resource 110 may be partitioned on a thread basis. For example, entries 112a-112f may correspond to thread 0, entries 114a-14f may correspond to thread 1, and entries 116a-116f may correspond to thread N. In other words, each one of the entries 112a-112f, 114a-114f, and 116a-116f within resource 110 may be allocated for use in each clock cycle by a single thread of the N available threads. Accordingly, a corresponding processor core may process instructions of 1 to N active threads, wherein N is an integer. Although N threads are shown, in one embodiment, resource 110 may only have two threads, thread 0 and thread 1. Also, control circuitry used for allocation, deallocation, the updating of counters and pointers, and other is not shown for ease of illustration.

A queue corresponding to entries 112a-112f may be duplicated and instantiated N times, one time for each thread in a multithreading system, such as a processor core. Each one of the entries 112a-112f, 114a-114f, and 116a-116f may store the same information. A shared storage resource may be an instruction queue, a reorder buffer, or other.

Similar to resource 110, static partitioning may be used in resource 120. However, resource 120 may not use duplicated queues, but provide static partitioning within a single queue. Here, entries 122a-122f may correspond to thread 0 and entries 126a-126f within a same queue may correspond to thread N. In other words, each one of the entries 122a-122f and 126a-126f within resource 120 may be allocated for use in each clock cycle by a single predetermined thread of the N available threads. Each one of the entries 122a-122f and 126a-126f may store the same information. Again, although N threads are shown, in one embodiment, resource 120 may only have two threads, thread 0 and thread 1. Also, control circuitry used for allocation, deallocation, the updating of counters and pointers, and other is not shown for ease of illustration.

For the shared storage resources 110 and 120, statically allocating an equal portion, or number of queue entries, to each thread may provide good performance, in part by avoiding starvation. The enforced fairness provided by this partitioning may also reduce the amount of complex circuitry used in sophisticated fetch policies, routing logic, or other. However, scalability may be difficult. As the number N of threads grows, the consumption of on-chip real estate and power consumption may increase linearly. Also, signal line lengths greatly increase. Cross-capacitance of these longer signal lines degrade the signals being conveyed by these lines. A scaled design may also include larger buffers, more repeaters along the long lines, an increased number of storage sequential elements on the lines, a greater clock cycle time, and a greater number of pipeline stages to convey values on the lines. System performance may suffer from one or a combination of these factors.

In addition, static division of resources may limit full resource utilization within a core. For example, a thread with the fewest instructions in the execution pipeline, such as a thread with a relatively significant lower workload than other active threads, maintains a roughly equal allocation of processor resources among active threads in the processor. The benefits of a static allocation scheme may be reduced due to not being able to dynamically react to workloads. Therefore, system performance may decrease.

Figure 2:
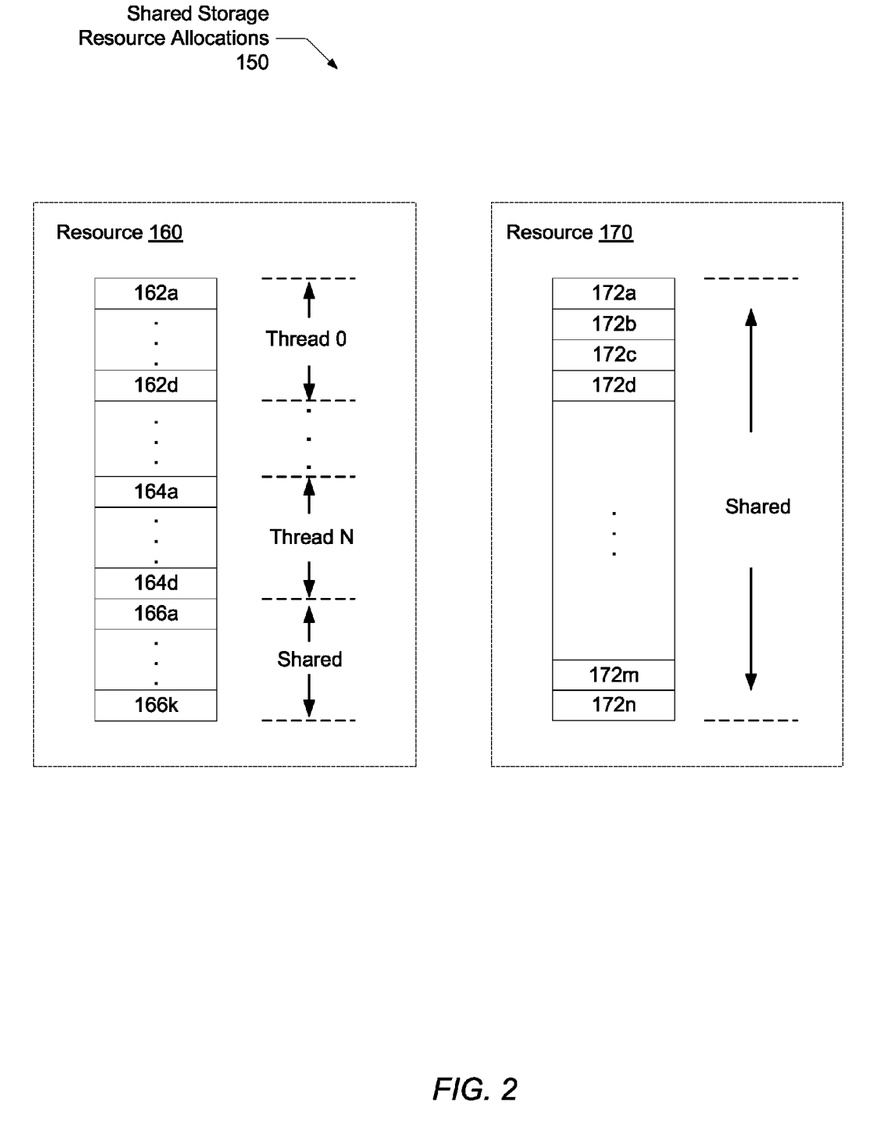
FIG. 2 is a generalized block diagram illustrating another embodiment of shared storage resource allocations.

Turning now to FIG. 2, another embodiment of shared storage resource allocations 150 is shown. In one embodiment, resource 160 corresponds to a queue used for data storage on a processor core, such as a reorder buffer, a branch prediction data array, a pick queue, or other. Similar to resource 120, resource 160 may include static partitioning of its entries within a single queue. Entries 162a-162d may correspond to thread 0 and entries 164a-164d may correspond to thread N. Entries 162a-162d, 164a-164d, and 166a-166k may store the same type of information within a queue. Entries 166a-166k may correspond to a dynamic allocation region within a queue. Each one of the entries 166a-166k may be allocated for use in each clock cycle by any of the threads in a processor core such as thread 0 to thread N.

In contrast to the above example with resource 120, dynamic allocation of a portion of resource 160 is possible with each thread being active. However, scalability may still be difficult as the number of threads N increases in a processor core design. If the number of entries 162a-162d, 164a-164d, and so forth is reduced to alleviate circuit design issues associated with a linear growth of resource 160, then performance is also reduced as the number of stored instructions per thread is reduced. Also, the limited dynamic portion offered by entries 166a-166k may not be enough to offset the inefficiencies associated with unequal workloads among threads 0 to N, especially as N increases.

Resource 170 also may correspond to a queue used for data storage on a processor core, such as a reorder buffer, a branch prediction data array, a pick queue, or other. Unlike the previous resources 110 to 160, resource 170 does not include static partitioning. Each one of the entries 172a-172n may be allocated for use in each clock cycle by any thread of the N available threads in a processor core. Control circuitry used for allocation, deallocation, the updating of counters and pointers, and other is not shown for ease of illustration.

In order to prevent starvation, the control logic for resource 170 may detect a thread hog and take steps to mitigate or remove the thread hog. A thread hog results when a thread accumulates a disproportionate share of a shared resource and the thread is slow to deallocate the resource. In some embodiments, the control logic detects a load miss to memory, wherein the miss is associated with a latency greater than a given threshold. In one embodiment, the load miss may be a miss to a last-level data cache. This miss may use hundreds of clock cycles before requested data is returned to a load/store unit within the processor. This long latency causes instructions in an associated thread to stall in the pipeline. These stalled instructions allocate resources within the pipeline, such as entries 172a-172h of resource 170, without useful work being performed. Therefore, throughput is reduced within the pipeline.

The control logic may select the load instruction or an immediately younger-in-program-order instruction for replay for the associated thread. A pipeline flush and replay for the associated thread may begin with the selected instruction. Instructions younger than the load instruction may be held at a given pipeline stage until the load instruction completes. In one embodiment, the given pipeline stage is the fetch pipeline stage. In other embodiments, a select pipeline stage between a fetch stage and a decode stage may be used for holding replayed instructions. During replay, this hold prevents resources from being allocated to instructions of the associated thread that are younger than the load instruction while the load instruction is being serviced.

Figure 3:
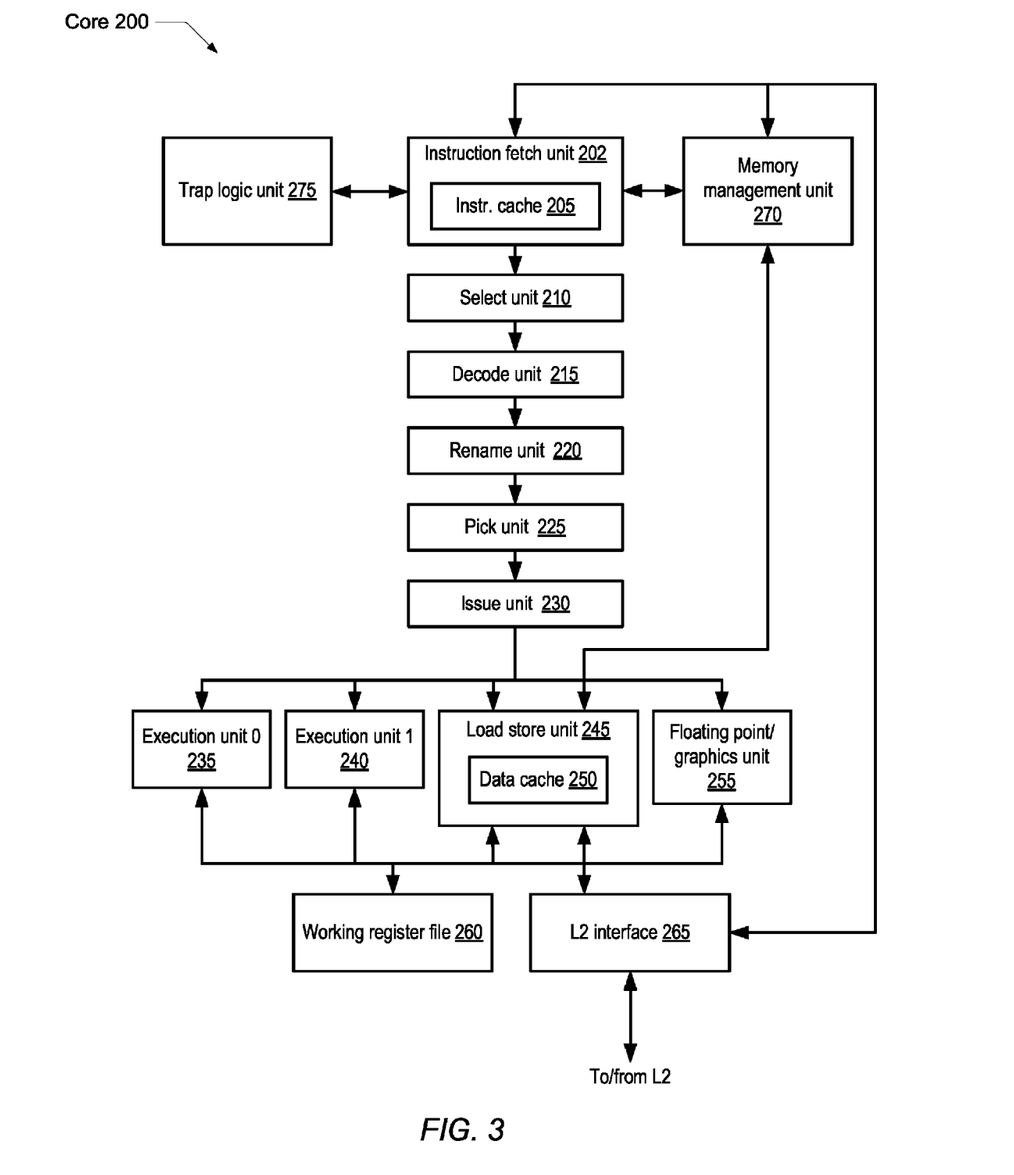
FIG. 3 is a generalized block diagram illustrating one embodiment of a processor core for performing dynamic multithreading.

Referring to FIG. 3, a generalized block diagram of one embodiment of a processor core 200 for performing dynamic multithreading is shown. Processor core, or core, 200 may utilize conventional processor design techniques such as complex branch prediction schemes, out-of-order execution, and register renaming techniques. Core 200 may include circuitry for executing instructions according to any of a variety of given instruction set architectures (ISA). Generally, processor core 200 may access a cache memory subsystem for data and instructions. In some embodiments, core 200 may contain its own level 1 (L1) and level 2 (L2) caches in order to reduce memory latency. Alternatively, these cache memories may be coupled to processor cores 200 in a backside cache configuration or an inline configuration, as desired. In one embodiment, a level 3 (L3) cache may be a last-level cache for the memory subsystem. A miss to the last-level cache may be followed by a relatively large latency for servicing the miss and retrieving the requested data. During the long latency, without thread hog mitigation, the instructions in the pipeline associated with the thread that experienced the miss may consume shared resources while stalled. As a result, this thread may be a thread hog and reduce throughput for the pipeline in core 200.

In one embodiment, processor core 200 may support execution of multiple threads. Multiple instantiations of a same processor core 200 that is able to concurrently execute multiple threads may provide high throughput execution of server applications while maintaining power and area savings. A given thread may include a set of instructions that may execute independently of instructions from another thread. For example, an individual software process may consist of one or more threads that may be scheduled for execution by an operating system. Such a core 200 may also be referred to as a multithreaded (MT) core or a simultaneous multithread (SMT) core. In one embodiment, core 200 may concurrently execute instructions from a variable number of threads, such as up to eight concurrently executing threads.

In various embodiments, core 200 may perform dynamic multithreading. Generally speaking, under dynamic multithreading, the instruction processing resources of core 200 may efficiently process varying types of computational workloads that exhibit different performance characteristics and resource requirements. Dynamic multithreading represents an attempt to dynamically allocate processor resources in a manner that flexibly adapts to workloads. In one embodiment, core 200 may implement fine-grained multithreading, in which core 200 may select instructions to execute from among a pool of instructions corresponding to multiple threads, such that instructions from different threads may be scheduled to execute adjacently. For example, in a pipelined embodiment of core 200 employing fine-grained multithreading, instructions from different threads may occupy adjacent pipeline stages, such that instructions from several threads may be in various stages of execution during a given core processing cycle. Through the use of fine-grained multithreading, core 200 may efficiently process workloads that depend more on concurrent thread processing than individual thread performance.

In one embodiment, core 200 may implement out-of-order processing, speculative execution, register renaming and/or other features that improve the performance of processor-dependent workloads. Moreover, core 200 may dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance.

In various embodiments, the resources of core 200 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

In the illustrated embodiment, core 200 includes an instruction fetch unit (IFU) 202 that includes an L1 instruction cache 205. IFU 202 is coupled to a memory management unit (MMU) 270, L2 interface 265, and trap logic unit (TLU) 275. IFU 202 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a L1 data cache 250, and/or a floating point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 200 are described. However, it is noted that the illustrated partitioning of resources is merely one example of how core 200 may be implemented. Alternative configurations and variations are possible and contemplated.

Instruction fetch unit (IFU) 202 may provide instructions to the rest of core 200 for processing and execution. In one embodiment, IFU 202 may select a thread to be fetched, fetch instructions from instruction cache 205 for the selected thread and buffer them for downstream processing, request data from L2 cache 205 in response to instruction cache misses, and predict the direction and target of control transfer instructions (e.g., branches). In some embodiments, IFU 202 may include a number of data structures in addition to instruction cache 205, such as an instruction translation lookaside buffer (ITLB), instruction buffers, and/or structures for storing state that is relevant to thread selection and processing.

In one embodiment, virtual to physical address translation may occur by mapping a virtual page number to a particular physical page number, leaving the page offset unmodified. Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may provide a translation. In one embodiment, MMU 270 may manage one or more translation tables stored in system memory and to traverse such tables (which in some embodiments may be hierarchically organized) in response to a request for an address translation, such as from an ITLB or data translation lookaside butter (DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may generate a trap to allow a memory management software routine to handle the translation.

Thread selection may take into account a variety of factors and conditions, some thread-specific and others IFU-specific. For example, certain instruction cache activities (e.g., cache fill), i-TLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved.

In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 202, instructions may actually be fetched for the selected thread. In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 202 may store the retrieved instructions within buffers for use by later stages of the instruction pipeline. If there is a cache miss, IFU 202 may coordinate retrieval of the missing cache data from L2 cache 105. In some embodiments, IFU 202 may also prefetch instructions into instruction cache 205 before the instructions are actually requested to be fetched.

During the course of operation of some embodiments of core 200, any of numerous architecturally defined or implementation-specific exceptions may occur. In one embodiment, trap logic unit 275 may manage the handling of exceptions. For example, TLU 275 may receive notification of an exceptional event occurring during execution of a particular thread, and cause execution control of that thread to vector to a supervisor-mode software handler (i.e., a trap handler) corresponding to the detected event. Such handlers may include, for example, an illegal opcode trap handler for returning an error status indication to an application associated with the trapping thread and possibly terminate the application, a floating-point trap handler for fixing an inexact result, etc. In one embodiment, TLU 275 may flush all instructions from the trapping thread from any stage of processing within core 200, without disrupting the execution of other, non-trapping threads.

Generally speaking, select unit 210 may select and schedule threads for execution. In one embodiment, during any given execution cycle of core 200, select unit 210 may select up to one ready thread out of the maximum number of threads concurrently supported by core 200 (e.g., 8 threads). The select unit 210 may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may allocate certain execution resources of core 200 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may identify the particular nature of an instruction (e.g., as specified by its opcode) and to determine the source and sink (i.e., destination) registers encoded in an instruction, if any. In some embodiments, decode unit 215 may detect certain dependencies among instructions, to remap architectural registers to a flat register space, and/or to convert certain complex instructions to two or more simpler instructions for execution.

Register renaming may facilitate the elimination of certain dependencies between instructions (e.g., write-after-read or "false" dependencies), which may in turn prevent unnecessary serialization of instruction execution. In one embodiment, rename unit 220 may rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may pick instructions that are ready for execution and send the picked instructions to issue unit 230. In one embodiment, pick unit 225 may maintain a pick queue that stores a number of decoded and renamed instructions as well as information about the relative age and status of the stored instructions. In some embodiments, pick unit 225 may support load/store speculation by retaining speculative load/store instructions (and, in some instances, their dependent instructions) after they have been picked. This may facilitate replaying of instructions in the event of load/store misspeculation or thread hog mitigation.

Issue unit 230 may provide instruction sources and data to the various execution units for picked instructions. In one embodiment, issue unit 230 may read source operands from the appropriate source, which may vary depending upon the state of the pipeline. In the illustrated embodiment, core 200 includes a working register file 260 that may store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may execute certain integer-type instructions defined in the implemented ISA, such as arithmetic, logical, and shift instructions. In some embodiments, architectural and non-architectural register files may be physically implemented within or near execution units 235-240. Floating point/graphics unit 255 may execute and provide results for certain floating-point and graphics-oriented instructions defined in the implemented ISA.

The load store unit 245 may process data memory references, such as integer and floating-point load and store instructions and other types of memory reference instructions. LSU 245 may include a data cache 250 as well as logic for detecting data cache misses and to responsively request data from the L2 cache. A miss to the L3 cache may be initially reported to the cache controller of the L2 cache. This cache controller may then send an indication of the miss to the L3 cache to the LSU 245.

In one embodiment, data cache 250 may be a set-associative, write-through cache in which all stores are written to the L2 cache regardless of whether they hit in data cache 250. In one embodiment, L2 interface 265 may maintain queues of pending L2 requests and arbitrate among pending requests to determine which request or requests may be conveyed to L2 cache during a given execution cycle. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher that predicts and prefetches data that is likely to be used in the future, in order to increase the likelihood that such data will be resident in data cache 250 when it is needed.

In various embodiments, LSU 245 may implement a variety of structures that facilitate memory operations. For example, LSU 245 may implement a data TLB to cache virtual data address translations, as well as load and store buffers for storing issued but not-yet-committed load and store instructions for the purposes of coherency snooping and dependency checking. LSU 245 may include a miss buffer that stores outstanding loads and stores that cannot yet complete, for example due to cache misses. In one embodiment, LSU 245 may implement a store queue that stores address and data information for stores that have committed, in order to facilitate load dependency checking. LSU 245 may also include hardware for supporting atomic load-store instructions, memory-related exception detection, and read and write access to special-purpose registers (e.g., control registers).

Figure 4:
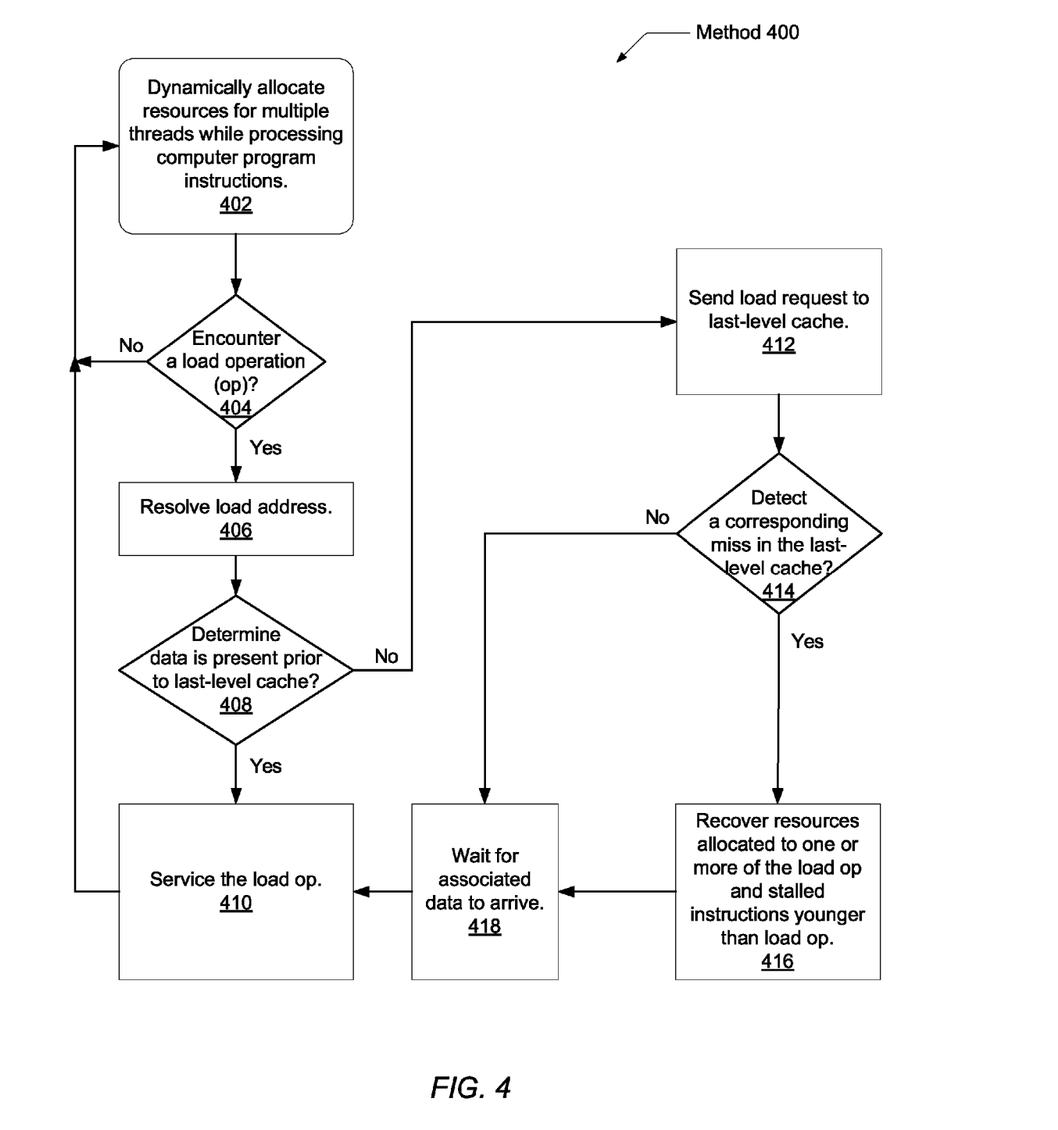
FIG. 4 is a generalized flow diagram illustrating one embodiment of a method for efficient mitigation of thread hogs in a processor.

Referring now to FIG. 4, a generalized flow diagram of one embodiment of a method 400 for efficient mitigation of thread hogs in a processor is illustrated. The components embodied in the processor core described above may generally operate in accordance with method 400. For purposes of discussion, the steps in this embodiment are shown in sequential order. However, some steps may occur in a different order than shown, some steps may be performed concurrently, some steps may be combined with other steps, and some steps may be absent in another embodiment.

A processor core 200 may be fetching instructions of one or more software applications for execution. In one embodiment, core 200 may perform dynamic multithreading. In block 402, the core 200 dynamically allocates shared resources for multiple threads while processing computer program instructions. In one embodiment, the select unit 210 may support out-of-order allocation and deallocation of resources.

In some embodiments, the select unit 210 may include a data structure (e.g., an allocate vector) in which each entry corresponds to an instance of a resource of a particular resource type and indicates the allocation status of the resource instance. The select unit 210 may update an element of the data structure to indicate that the resource has been allocated to a selected instruction. For example, select unit 210 may include one allocate vector corresponding to entries of a reorder buffer, another allocate vector corresponding to entries of a load buffer, yet another allocate vector corresponding to entries of a store buffer, and so forth. Each thread in the multithreaded processor core 200 may be associated with a unique thread identifier (ID). In some embodiments, select unit 210 may store this thread ID to indicate resources that have been allocated to the thread associated with the ID.

If a load operation is fetched and decoded for a given thread (conditional block 404), then in block 406, an associated address may be calculated. To obtain the requested data, this calculated address may initially be used to access a store buffer for possible data forwarding and a level 1 (L1) data cache. A level 2 (L2) cache may be accessed if the requested data is not found in either the store buffer or the L1 cache.

If the requested data is present in a data storage structure, such as a buffer or cache, prior to a particular cache level of a cache hierarchy (e.g., the last-level cache) in the memory subsystem (conditional block 408), then in block 410 the load operation is serviced with the requested data and ready to commit. Otherwise, in block 412, the load request may be sent to the last-level cache. In one embodiment, a cache controller for the next-to-last-level cache sends the request to the last-level cache when a miss occurs to the next-to-last-level cache. For example, the cache controller for the L2 cache may send the request to the L3 cache in response to a miss to the L2 cache.

It is noted that although the processor core 200 may perform a replay of load operations in response to misspeculation of the load operations, in various embodiments the core 200 does not replay a load due to misses to the cache hierarchy prior to the last-level cache. Therefore, the requested data may return before a replayed load operation is ready again to receive it. Throughput may actually reduce if the load operations are replayed in these cases.

If a miss is detected to the last-level cache (conditional block 414), then in one embodiment, shared resources allocated to one or more of the load operation and stalled instructions younger than the load operation for an associated thread may be recovered in block 416. For example, associated entries in shared arrays within the pick unit, reorder buffer, or otherwise, may be deallocated for the one or more of the load operation and stalled instructions younger than the load operation. Further details are provided shortly below.

In another embodiment, the core 200 may wait until the load operation is the oldest operation in the pipeline for the associated thread before recovering shared resources from the associated thread. In one embodiment, the cache controller for the last-level cache (e.g., L3 cache) may send an indication of the miss to the cache controller of the next-to-last-level cache (e.g., L2 cache). The cache controller of the next-to-last-level cache (e.g., L2 cache) may subsequently send an indication of the miss to the LSU 245 in the core 200. In response to receiving this indication, the LSU 245 may report the miss condition to the trap unit 275 as a microarchitectual exception. In response to the reported condition, the trap unit 275 may perform a hardware "trap".

The steps taken in this hardware trap may include flushing the pipeline of one or more instructions of the associated thread including the load operation and instructions younger than the load operation.

In block 418, the load operation waits for its requested data to arrive from lower-level memory. Once the requested data arrives, the load operation is serviced and ready to commit in block 410. Afterward, control flow of method 400 returns to block 402. If in conditional block 414 a miss is not detected to the last-level cache, then control flow of method 400 moves to block 418 and the load operation waits for its requested data to arrive from lower-level memory.

Figure 5:
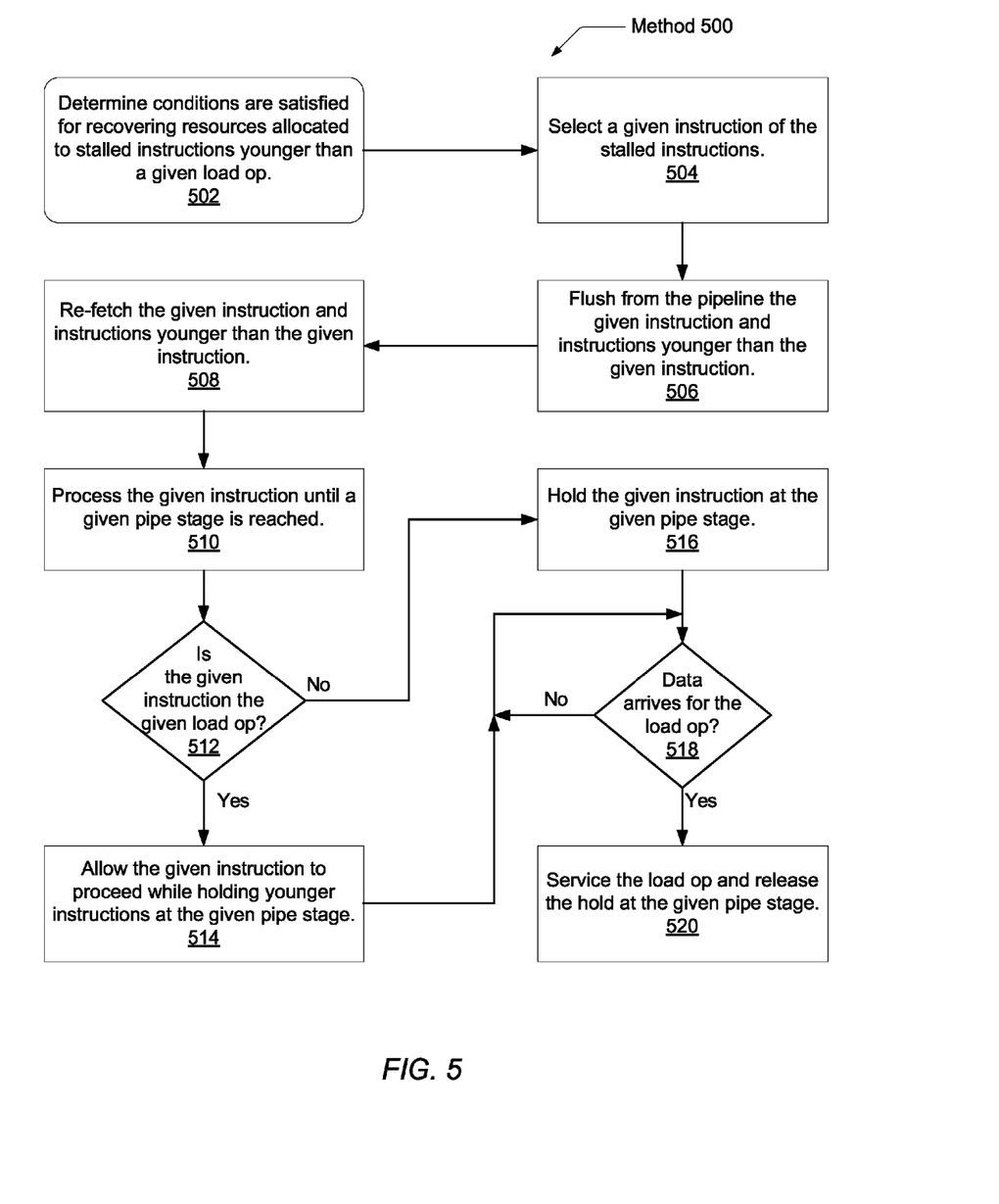
FIG. 5 is a generalized flow diagram of one embodiment of a method for efficient shared resource utilization in a processor.

Referring now to FIG. 5, a generalized flow diagram of one embodiment of a method 500 for efficient shared resource utilization in a processor is illustrated. The components embodied in the processor core described above may generally operate in accordance with method 500. For purposes of discussion, the steps in this embodiment are shown in sequential order. However, some steps may occur in a different order than shown, some steps may be performed concurrently, some steps may be combined with other steps, and some steps may be absent in another embodiment.

In block 502, control logic within the processor core 200 may determine conditions are satisfied for recovering resources allocated to at least stalled instructions younger than a given load operation. The given load operation may have a read request miss in the last-level cache as described above regarding blocks 414 and 416 of method 400. In one embodiment, the control logic has sufficient on-die real estate and sufficient cycle time to begin recovering resources as soon as the miss to the last-level cache is detected. In another embodiment, the control logic may report the miss condition to the trap unit 275 as a microarchitectual exception. In response to detecting the load operation is the oldest operation in the pipeline for the associated thread, the control logic may determine conditions are satisfied for recovering resources allocated to at least stalled instructions younger than a given load operation. At this time, the trap unit 275 may perform a hardware "trap".

In block 504, the control logic may select a given instruction of the stalled instructions. In one embodiment, the control logic selects the load operation. In another embodiment, the control logic selects an oldest instruction of the one or more instructions younger than the load operation as the given instruction. In one embodiment, the load operation is a candidate for being selected if the load operation qualifies for instruction replay. The load operation may qualify for instruction replay if the load operation is permitted to be interrupted once started. In various embodiments, memory access operations that may not qualify for instruction replay include atomic instructions, SPR read and write operations, and input/output (I/O) read and write operations. Other non-qualifying memory access operations may include block load and store operations.

In block 506, in various embodiments, the given instruction and instructions younger than the given instruction within the associated thread are flushed from the pipeline. Shared resources allocated to the given instruction and instructions younger than the given instruction in the pipeline are freed and made available to other threads for instruction processing. In response to detecting the given instruction is the load operation, the LSU 245 may treat the memory access for the first execution of the load operation as a prefetch in the miss buffer. In other embodiments, prior to a flush of instructions in the associated thread from the pipeline, each of the instructions younger than the given instruction is checked to determine whether it qualifies for instruction replay. If it does not qualify for instruction replay, then it is checked to determine whether it has begun execution. If an instruction younger than the given instruction does not qualify for instruction replay and it has begun execution, then a flush of the pipeline for the associated thread may not be performed. Otherwise, the given instruction and instructions younger than the given instruction within the associated thread may be flushed from the pipeline.

In block 508, the given instruction and instructions younger than the given instruction may be re-fetched. In block 510, the core 200 may process the given instruction until a given pipeline stage is reached. In one embodiment, the fetch pipeline stage is the given pipeline stage. In another embodiment, the select pipeline stage is the given pipeline stage. In yet another embodiment, another pipeline stage may be chosen as the given pipeline stage. If the given instruction is the load operation (conditional block 512), then in block 514, the given instruction is allowed to proceed while younger instructions are held at the given pipeline stage. In another embodiment, the load operation may be held at the given pipeline stage until an indication is detected that the requested data has arrived and it is ready.

If the given instruction is not the load operation (conditional block 512), then in block 516, for the associated thread, the given instruction is held at the given pipeline stage in addition to the instructions younger than the candidate instruction. If the requested data arrives for the load operation (conditional block 518), then in block 520 the load operation is serviced and ready to commit. In addition, for the associated thread, the hold is released at the given pipeline stage and instructions younger in-program-order than the given instruction are allowed to proceed past the given pipeline stage.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
   a control logic circuit; and
   one or more resources in a pipeline shared by a plurality of active software threads, wherein each of the one or more resources comprises a plurality of entries allocated to at least two of the plurality of active software threads;
   wherein in response to detecting a load operation miss corresponding to a load operation in a given active thread of the plurality of active software threads to a last-level cache, the control logic circuit is configured to:
   select the load operation as a given instruction from the given active thread of the plurality of active software threads, in response to determining the load operation qualifies for instruction replay by determining the load operation is permitted to be interrupted once started;

select an oldest instruction of one or more instructions younger than the load operation as the given instruction, in response to determining the load operation does not qualify for instruction replay by determining the load operation is not permitted to be interrupted once started;

flush from the pipeline at least one or more instructions younger than the given instruction, wherein flushing the pipeline prevents further execution of the at least one or more instructions younger than the given instruction;

re-fetch at least the flushed one or more instructions younger than the given instruction; and hold at a given stage of the pipeline at least the re-fetched one or more instructions younger than the given instruction until the load operation is serviced with data corresponding to the load operation, wherein said hold prevents one or more resources past the given stage from being allocated to at least the re-fetched one or more instructions younger than the given instruction within the given active thread.

2. The processor as recited in claim 1, wherein to determine the load operation is not permitted to be interrupted once started, the control logic circuit is further configured to determine the load operation is one of an atomic instruction, a block load operation or an input/output (I/O) read operation.

3. The processor as recited in claim 2, wherein the control logic circuit is further configured to re-fetch the given instruction and one or more instructions younger than the given instruction.

4. The processor as recited in claim 1, wherein in response to detecting the given instruction is the load operation, the control logic circuit is further configured to hold a re-fetched load operation at the given stage of the pipeline until receiving an indication the data corresponding to the load operation has arrived in the pipeline.

5. The processor as recited in claim 1, wherein the re-fetched one or more instructions younger than the given instruction are held at the given stage until the load operation is completed.

6. The processor as recited in claim 1, wherein in response to detecting the given instruction is the load operation, the given instruction has been flushed, and the given instruction has been re-fetched, the control logic circuit is further configured to allow the re-fetched given instruction to proceed past the given stage while holding at the given stage the re-fetched one or more instructions younger than the load operation.

7. A method for use in a processor, the method comprising:

sharing one or more resources in a pipeline by a plurality of active software threads, wherein each of the one or more resources comprises a plurality of entries allocated to at least two of the plurality of active software threads; and in response to detecting a miss to memory corresponding to a load operation in a given active thread of the plurality of active software threads, wherein the miss is associated with a latency greater than a given threshold:

selecting the load operation as a given instruction, in response to determining the load operation qualifies for instruction replay by determining the load operation is permitted to be interrupted once started;

selecting an oldest instruction of one or more instructions younger than the load operation as the given instruction, in response to determining the load operation does not qualify for instruction replay by determining the load operation is not permitted to be interrupted once started;

flushing from the pipeline at least one or more instructions younger than the given instruction, wherein flushing the pipeline prevents further execution of the at least one or more instructions younger than the given instruction;

re-fetching at least the flushed one or more instructions younger than the given instruction; and holding at a given stage of the pipeline at least the re-fetched one or more instructions younger than the given instruction until at least the load operation within the given active thread is serviced with data associated with the load operation, wherein said hold prevents one or more resources past the given stage from being allocated to at least the re-fetched one or more instructions younger than the given instruction within the given active thread.

8. The method as recited in claim 7, wherein the miss to memory comprises a miss to a last-level cache.

9. The method as recited in claim 8, further comprising re-fetching the given instruction and the one or more instructions younger than the given instruction.

10. The method as recited in claim 7, wherein in response to detecting the given instruction is the load operation, the method further comprises holding at the given stage of the pipeline the load operation after being flushed and refetched.

11. The method as recited in claim 7, wherein the load operation is completed after the miss to memory is serviced.

12. The method as recited in claim 7, wherein in response to detecting the given instruction is the load operation, the given instruction has been flushed, and the given instruction has been re-fetched, the method further comprises allowing the given instruction to proceed past the given pipeline stage while holding at the given stage of the pipeline re-fetched instructions younger than the load operation until detecting a condition caused by instruction processing within the given active thread is satisfied.

13. A non-transitory computer readable storage medium storing program instructions operable to efficiently arbitrate threads in a multi-threaded resource, wherein the program instructions are executable by a processor to:

share one or more resources in a pipeline by a plurality of active software threads, wherein each of the one or more resources comprises a plurality of entries allocated to at least two of the plurality of active software threads; and in response to detecting a miss to memory corresponding to a load operation in a given active thread of the plurality of active software threads, wherein the miss is associated with a latency greater than a given threshold:

select the load operation as a given instruction, in response to determining the load operation qualifies for instruction replay by determining the load operation is permitted to be interrupted once started;

select an oldest instruction of one or more instructions younger than the load operation as the given instruction, in response to determining the load operation does not qualify for instruction replay by determining the load operation is not permitted to be interrupted once started;

flush from the pipeline at least one or more instructions younger than the given instruction in the given active thread, wherein flushing the pipeline prevents further execution of the at least one or more instructions younger than the given instruction;

re-fetch at least the flushed one or more instructions younger than the given instruction; and hold at a given stage of the pipeline at least the re-fetched one or more instructions younger than the given instruction until at least the load operation within the given active thread is serviced with data associated with the load operation, wherein said hold prevents one or more resources past the given stage from being allocated to at least the re-fetched one or more instructions younger than the given instruction within the given active thread.

14. The storage medium as recited in claim 13, wherein to determine the load operation is not permitted to be interrupted once started, the program instructions are further executable to determine the load operation is one of an atomic instruction, a block load operation or an input/output (I/O) read operation.

* * * * *

UNITED STATES PATENT AND TRADEMARK OFFICE
CERTIFICATE OF CORRECTION

PATENT NO. : 9,665,375 B2  Page 1 of 1
APPLICATION NO. : 13/457055
DATED : May 30, 2017
INVENTOR(S) : Chou et al.

It is certified that error appears in the above-identified patent and that said Letters Patent is hereby corrected as shown below:

In the Specification

In Column 6, Line 66, delete "(DTLB" and insert -- (DTLB) --, therefor.

In Column 10, Line 66, delete "microarchitectual" and insert -- microarchitectural --, therefor.

In Column 11, Line 34, delete "microarchitectual" and insert -- microarchitectural --, therefor.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*